United States Patent [19]

Tezuka et al.

[11] Patent Number: 4,841,278
[45] Date of Patent: Jun. 20, 1989

[54] SELF-ILLUMINANT DELINEATOR AND DELINEATOR SYSTEM BY USE THEREOF

[75] Inventors: Hirofumi Tezuka; Kouji Nogami; Toshihide Koyano, all of Shiga, Japan

[73] Assignee: Kyocera Corporation, Kyoto, Japan

[21] Appl. No.: 29,372

[22] Filed: Mar. 23, 1987

Related U.S. Application Data

[63] Continuation-in-part of Ser. No. 748,730, Jun. 25, 1985, abandoned.

[30] Foreign Application Priority Data

Jun. 27, 1984 [JP] Japan ............................ 59-97524[U]
Jul. 30, 1984 [JP] Japan ............................ 59-118315[U]
Jan. 31, 1985 [JP] Japan ................................ 59-19070

[51] Int. Cl.$^4$ ................................................ E01F 9/00
[52] U.S. Cl. .................................... 340/908.1; 340/331
[58] Field of Search ............... 340/114 R, 114 B, 331, 340/332, 985; 362/183

[56] References Cited

U.S. PATENT DOCUMENTS

| | | | |
|---|---|---|---|
| 3,018,313 | 1/1962 | Gattone | 136/246 |
| 3,938,080 | 2/1976 | Hulme | 340/114 B |
| 4,050,834 | 9/1977 | Lee | 362/145 X |
| 4,108,405 | 8/1978 | Gibson | 340/47 X |
| 4,132,983 | 1/1979 | Shapiro | 340/114 B X |
| 4,203,091 | 5/1980 | Kruskopf | 340/114 B X |
| 4,389,632 | 6/1983 | Seidler | 340/114 B X |

Primary Examiner—Joseph A. Orsino
Assistant Examiner—Jeffery A. Hofsass
Attorney, Agent, or Firm—Spensley Horn Jubas & Lubitz

[57] ABSTRACT

A self-illuminant delineator including a plurality of light-emitting diodes being flickerably disposed on the sign surface of the delineator and covered by a transparent cover, a solar cell module being disposed on the top surface of the delineator and covered with a transparent cover, a transmission means and/or a receiving means for a signal which controls the flickering of the light-emitting diodes. Also a self-illuminant delineator system including a plurality of the above self-illuminant delineators which are installed to form a line-up of an eye-guiding, traffic or other sign along a shoulder of a road.

12 Claims, 15 Drawing Sheets

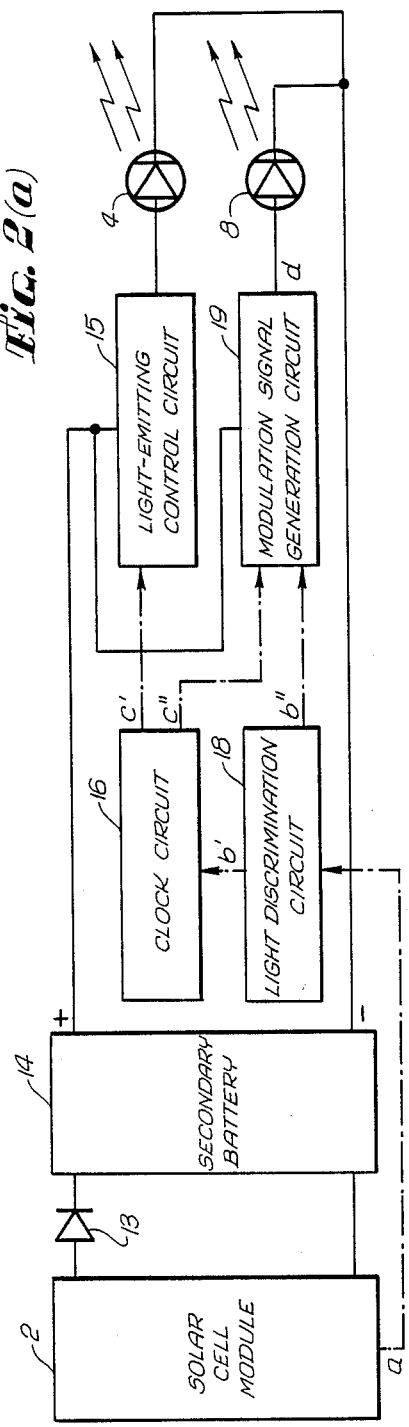
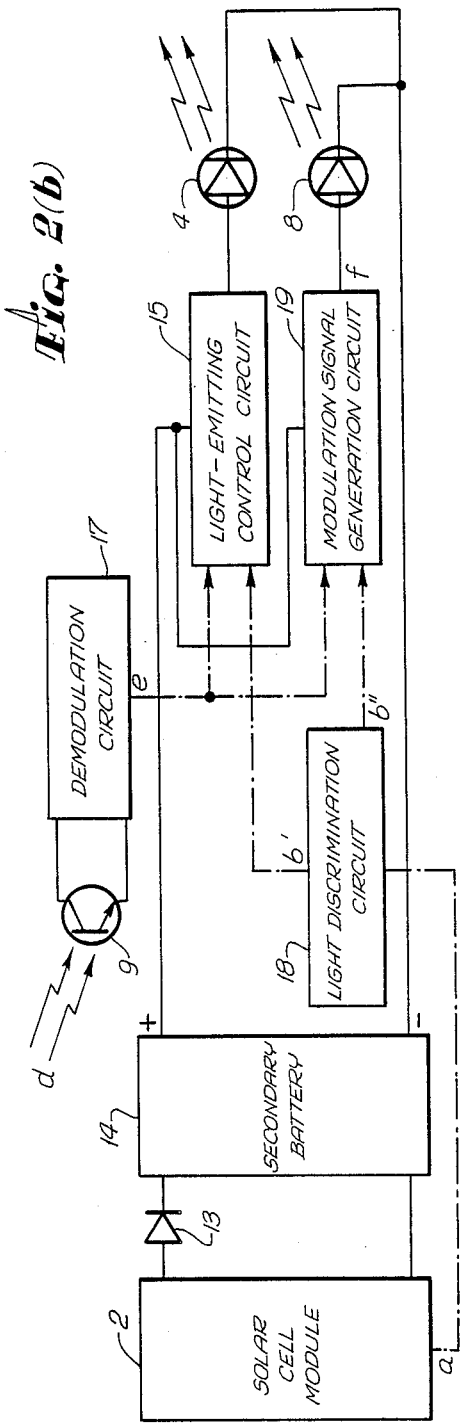

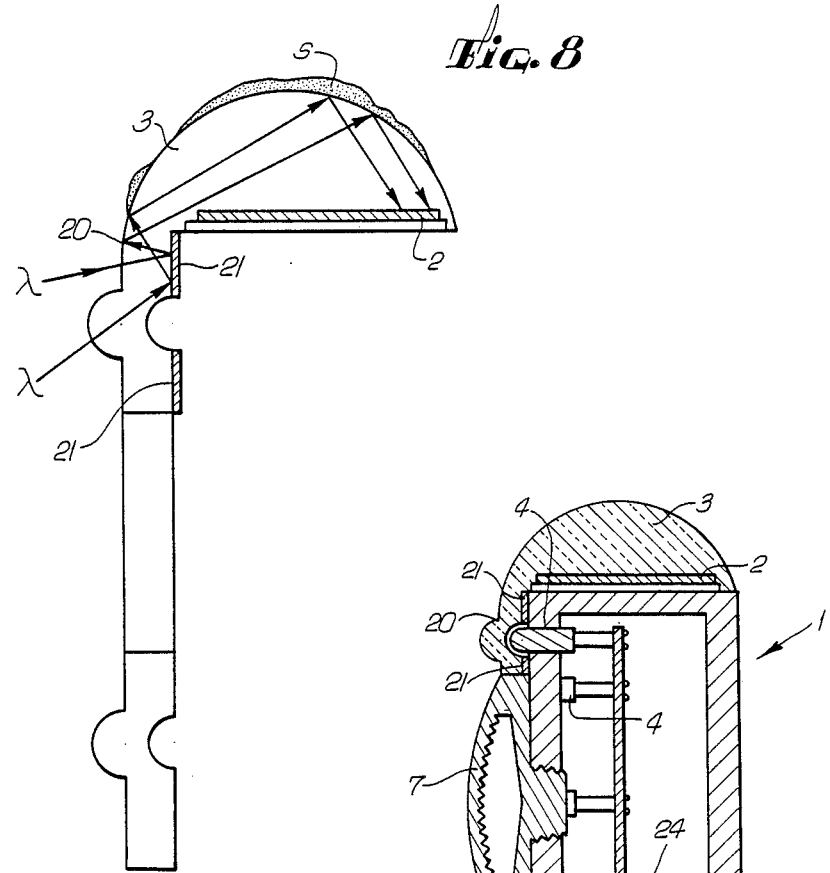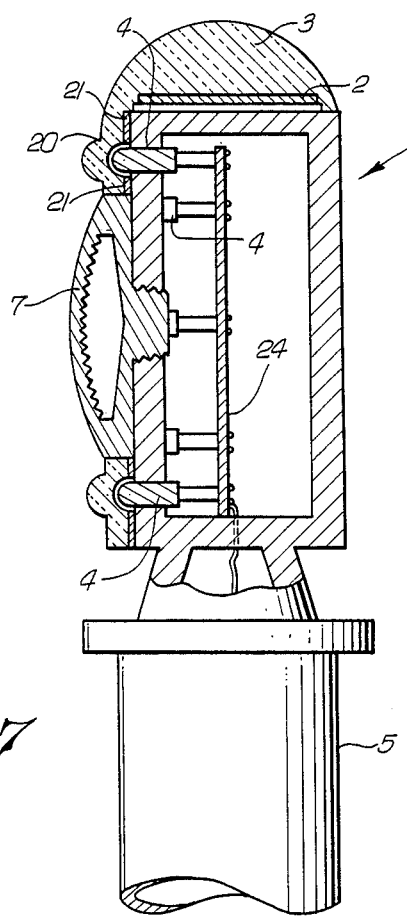

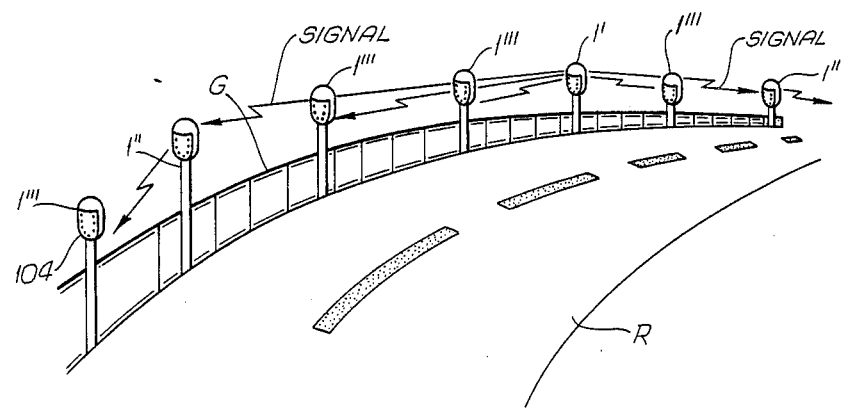

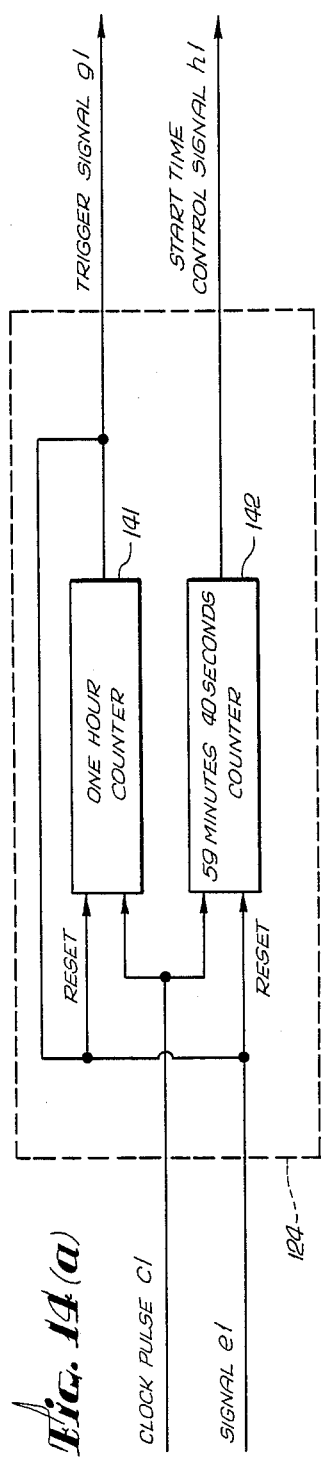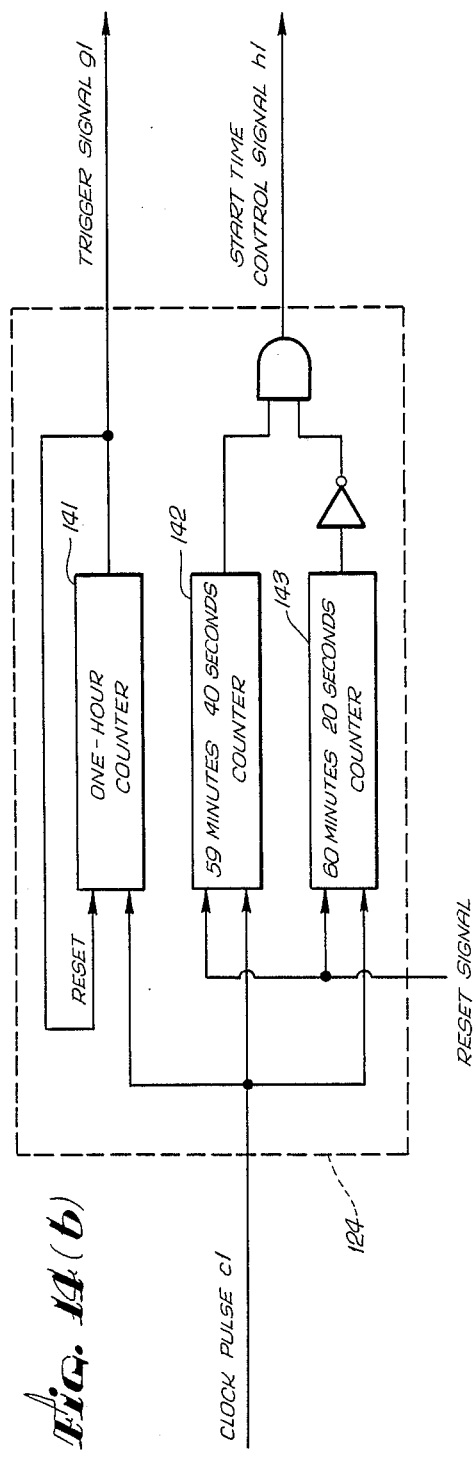
Fig. 14(a)
Fig. 14(b)

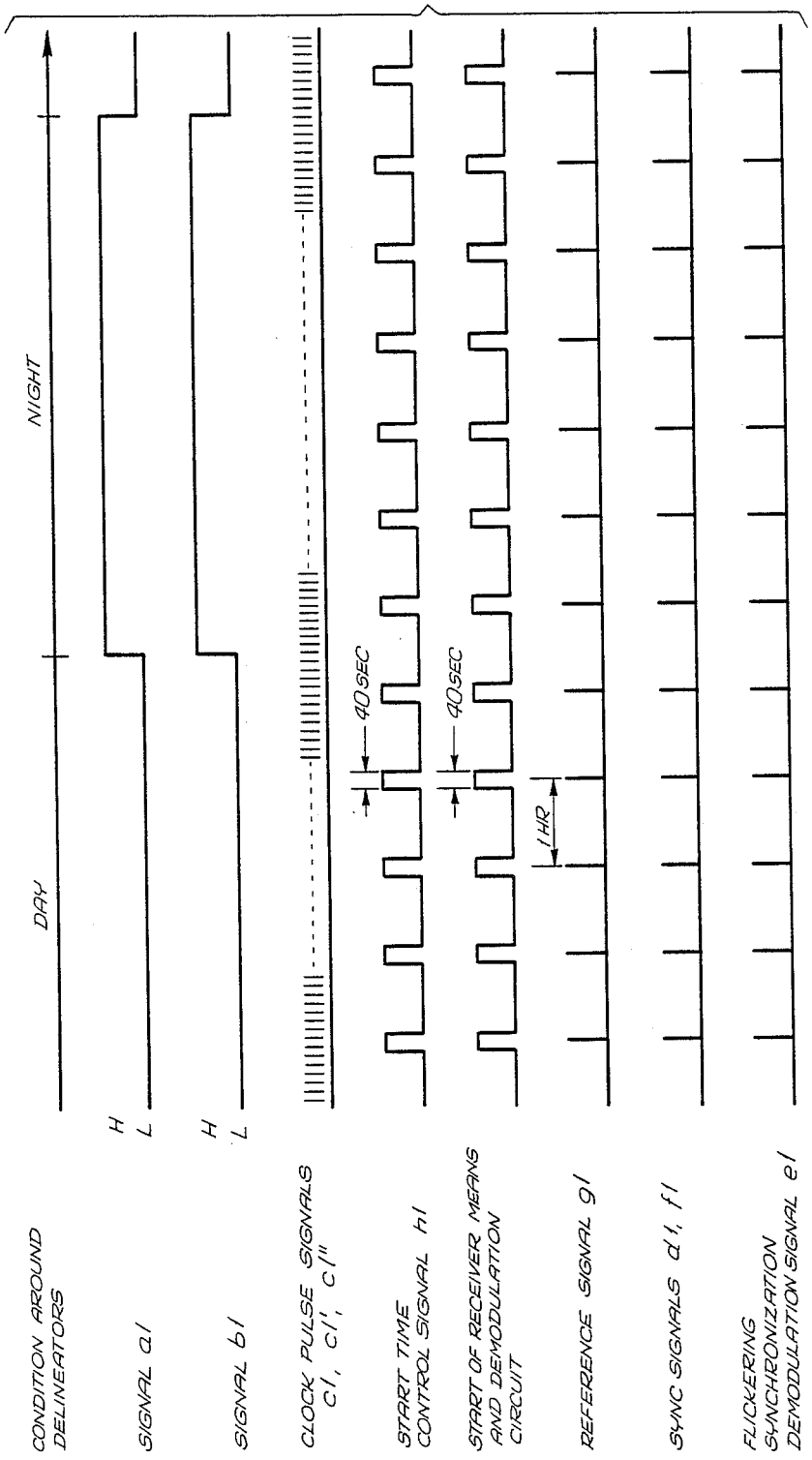

SELF-ILLUMINANT DELINEATOR AND DELINEATOR SYSTEM BY USE THEREOF

This is a continuation-in-part of copending application Ser. No. 748,730 filed on June 25, 1985 now abandoned.

BACKGROUND OF THE INVENTION

1. Field of the Invention

The present invention relates to a self-illuminant delineator and a delineator system by use of a plurality of self-illuminant delineators each of which flickers a plurality of light-emitting diodes utilizing solar cells as power supply to arise drivers' attention.

2. Prior Art

Self-illuminant delineators which are installed to indicate road shoulders and to guide drivers' eyes at zigzag courses are powered by commercial power supply or dry batteries. When they are used on roads where it is impossible to use commercial power supply, they require troublesome maintenance such as periodical exchange of dry batteries. To solve this problem, a self-illuminant delineator which operates on solar cells has been proposed (refer to Japanese Utility Model Provisional Publication No. 52-95389, Japanese Patent Provisional Publication No. 52-89081 and Japanese Patent Provisional Publication No. 52-89082).

The self-illuminant delineator uses solar cells as power supply for light-emitting diodes and as a means for detecting the brightness of the surrounding area so that the detected signals can turn on or off the light-emitting diodes. That is, the output voltage of the solar cells is converted into a signal. More particularly, when the output voltage of the solar cells is high in the daytime, the output is charged in a battery. When the output voltage drops below a certain level after sunset, the battery is discharged so that the light-emitting diodes light or flicker (hereafter "flicker" is referred to). When the output voltage of the solar cells increases above the certain level after sunrise, battery discharge stops and the output of the solar cells is charged in the battery.

In practice, a plurality of the self-illuminating delineators are usually installed at equal intervals where roads are winding or where traffic accidents occur frequently. These delineators have the following defects. If one of the self-illuminant delineators is installed under the shadow of an obstacle, such as a tree, only the delineator begins to flicker. Even if the flickering period of each delineator is set at a certain value, all the delineators do not have the same cycle. Thus, the delineators flicker at random cycles when viewed the entire lineup. As a result, the delineators cannot provide proper traffic information and drivers are perplexed.

SUMMARY OF THE INVENTION

It is therefore an object of the present invention to provide a self-illuminant delineator and a delineator system which are free of the aforementioned defects when a plurality of such delineators are installed to form a line-up of an eye-guiding, traffic or other sign along a shoulder of a road, that is, the system can flicker in coordination with one another to provide proper traffic information to drivers while maintaining the greatest benefit of using solar cells as the power supply, that is, easy installation (no wiring work for commercial power is necessary). The object of the present invention is achieved by a construction comprising a plurality of flickable light-emitting diodes covered with a transparent cover on the sign surface of a delineator casing, a solar cell module disposed on the top of the delineator casing and covered with a transparent cover, and a means for transmitting and/or a means for receiving a signal to control the light-emitting diodes so that they flicker.

The object will become apparent when preferred embodiments of the present invention are considered in connection with the accompanying drawings.

BRIEF DESCRIPTION OF THE DRAWINGS

FIGS. 4 to 10 illustrate the extensively modified embodiments of the self-illuminant delineator of the present invention, FIG. 4 illustrates the relationship between the output current and elapsed time for the solar cell module covered with a transparent oval hemisphere cover as well as that not covered, FIG. 5 illustrates the relationship between the output current and the illuminance of the sunlight for the solar cell module covered as well as that not covered, FIG. 6 illustrates the increasing ratio in percentage of the output current of the solar cell module covered over that not covered, FIG. 7 is a vertical sectional view illustrating another modified embodiment of the transparent cover for the solar cell module, FIG. 8 illustrates the function of the modified embodiment illustrated in FIG. 7, FIG. 9 is a vertical sectional view of the modified embodiment of the transparent cover for the light-emitting diodes, FIG. 10 illustrates the function of the modified embodiment shown in FIG. 9

FIG. 11 is a perspective view of another embodiment of a self-illuminant delineator system of the present invention.

FIG. 14(a) is a block circuit diagram of a timer circuit;

FIG. 14(b) is a block circuit diagram of another embodiment of a timer circuit;

FIG. 18 is a signal time chart of the operation of a delineator.

DETAILED DESCRIPTION OF THE INVENTION

Figure 1:
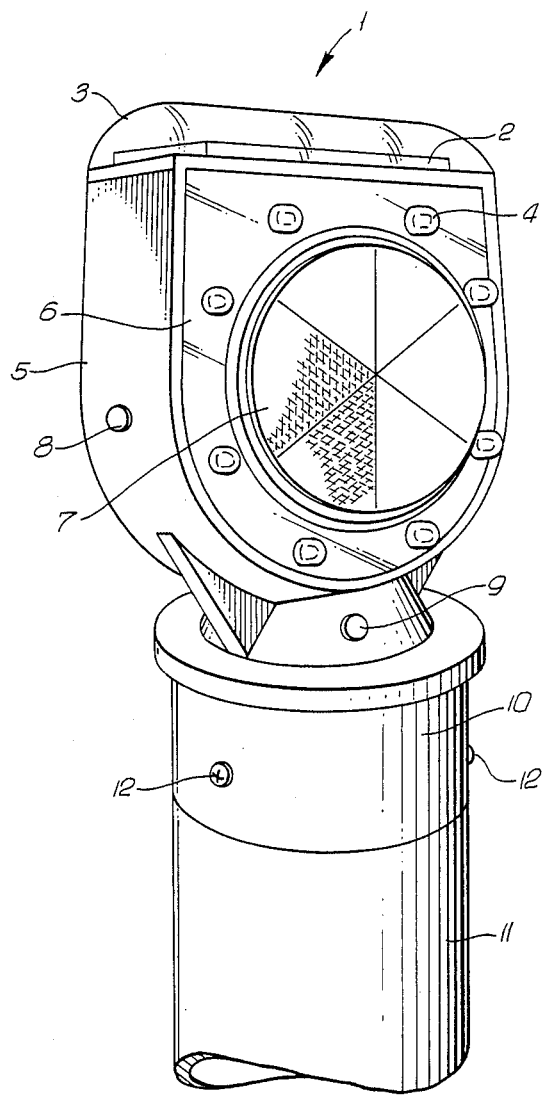
FIG. 1 is a perspective view of the self-illuminant delineator of the present invention, FIG. 2 (a) is a block circuit diagram of a self-illuminant delineator which functions as the key station of the self-illuminant delineator system of the present invention, FIG. 2 (b) is a block circuit diagram of a self-illuminant delineator which functions as a relay delineator of the self-illuminant delineator system.

As shown in FIG. 1, the self-illuminant delineator 1 of the present invention is composed of a solar cell module 2, a transparent cover 3 (cell case), light-emitting diodes 4 and a delineator casing (hereafter referred to as "body casing") 5.

The solar cell module 2, which is made of crystal silicon, amorphous silicon, GaAs, macromolecular semiconductor, etc., supplies electric power to the light-emitting diodes 4, by generating electricity when subjected to light having an intensity higher than a certain level.

The transparent cover 3, which is made of transparent resin having a shape of an almost oval hemisphere, is used to protect the solar cell module 2 against open air and to efficiently condense the sunlight in the solar cell module 2.

The light-emitting diodes 4 are controlled by a block circuit described later to flicker in the nighttime or when the illuminance of the sunlight is low. The body casing 5 is used to secure the transparent cover 3, a front cover 6 and a reflector 7 which are described later. The body casing 5 is also used to protect the internal electrical circuits and a secondary battery. For this purpose, the body casing 5 is made of polycarbonate resin superior in weatherability and shock resistance.

On the top of the body casing 5, the solar cell module 2 is mounted. On the solar cell module 2, transparent resin, such as EVA or silicon resin is filled to protect the solar cell module 2.

On the top of the transparent resin, the transparent cover 3 is mounted. The output of the solar cell module 2 is fed to the electronic control circuit and the secondary battery through wires (not shown). A plurality of the light-emitting diodes 4 are mounted on the printed circuit board 23 installed inside the body casing 5 so that the diodes 4 are equally spaced along a circle outside the reflector 7 and projected from the front surface of the body casing 5. Furthermore, the transparent front cover 6 is attached to the body casing 5 to cover the light-emitting diodes 4. This transparent front cover 6 completely prevents moisture from entering from the projected sections of the light-emitting diodes 4 and the body casing 5.

Figure 3:
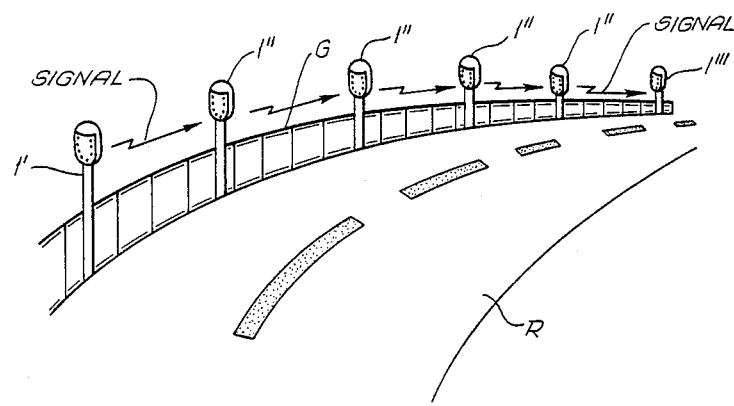
FIG. 3 is a perspective view of the self-illuminant delineator system of the present invention.

At the center of the circle along which the light-emitting diodes 4 are disposed, the retroreflection reflector 7 is disposed concentrically to the light-emitting diodes 4 so that the self-illuminant delineator 1 can be recognized more easily. Numeral 10 designates a mounting member which is used to install the body casing 5 on a support pole 11 using fastening means 12 such as screws. On the external surface of the body casing 5, a transmission means 8 is disposed to transmit a control signal for synchronous flickering to the adjacent self-illuminant delineator 1. A reception means 9 is also disposed on the external surface of the body casing 5 to receive the control signal for synchronous flickering from a self-illuminant delineator 1 installed ahead. The transmission and reception means 8 and 9 include a combination of an infrared LED and a photosensor such as photodiode, or antennas for transmitting and receiving an FM signal. FIG. 3 illustrates a self-illuminant delineator system in which a plurality of the self-illuminant delineators 1 are installed at equal intervals along a road guide rail. More specifically, a plurality of the self-illuminant delineators 1 are provided at equal intervals together with a guide rail G which is installed along a curved shoulder of a speedway R. Numeral 1' designates a self-illuminant delineator which functions as a key station. This self-illuminant delineator 1' generates a signal for automatically flickering the light-emitting diodes 4 and a signal synchronous to the automatic flickering signal. Numeral 1'' designates self-illuminant delineators which are installed between the key station self-illuminant delineator 1' and the last delineator in the line-up (hereafter referred to as "terminal delineator") described below, and function as relay delineators. Each relay delineator receives a sync signal to flicker the light-emitting diodes and transmits the sync signal for flickering to the adjacent delineator 1''. Numeral 1''' designates the terminal delineator which receives the sync signal to synchronously flicker the light-emitting diodes 4. Referring now to FIGS. 2 (a) and 2 (b), the block circuit of the self-illuminant delineator of the present invention is detailed. FIG. 2 (a) is the block circuit diagram of the self-illuminant delineator 1' which functions as the key station. FIG. 2 (b) is the block circuit diagram of the relay self-illuminant delineator 1'' or the terminal self-illuminant delineator 1'''. In the diagrams, like numerals designate common sections. Referring first to the block circuit diagrams in FIG. 2 (a) and 2 (b), the main circuit which is common to both diagrams is detailed. Via a reverse blocking diode 13, the solar cell module 2 is connected to a secondary battery 14, such as a Ni—Cd battery accommodated in the pole 11. The secondary battery 14 stores electromotive force generated by the solar cell module 2 and reserves the electromotive force when no electricity is generated in the daytime for an extended period of time. The positive electrode of the secondary battery 14 is connected to the P-type electrodes of the light-emitting diodes 4 via a light-emitting control circuit 15. The negative electrode of the secondary battery 14 is connected to the N-type electrodes of the light-emitting diodes 4 to apply forward bias voltage to the light-emitting diodes 4.

The light-emitting control circuit 15 composed of a monostable multivibrator, switching transistor, current-limiting resistor, etc. is activated by the signals from a clock circuit 16, demodulation circuit 17 and lighting discrimination circuit 18 to flicker the red or orange ultra-high luminance light-emitting diodes 40 to 120 times per minute. Referring to FIG. 2 (a), a voltage signal of the power generated by the solar cell module 2 is input to the lighting discrimination circuit 18. The lighting discrimination circuit 18 compares the voltage signal a with a reference voltage and outputs switching signals b' and b'' if the voltage signal a is below the reference voltage.

More particularly, if the voltage generated by the solar cell module 2 decreases when it is dark in the evening or in cloudy weather, the voltage signal a changes and the switching signals b' and b'' are generated. A photosensor such as Cds (not shown) can be used for detecting the illuminance of the sunlight instead of detecting the voltage generated by the solar cell module 2 in the circuit 18.

The clock circuit 16 receives the switching signal b' and outputs clock signals c' and c'' 40 to 120 times per minute. The clock signal c' from the clock circuit 16 is input to the light-emitting control circuit 15. The light-emitting control circuit 15 turns on the main circuit (power supply circuit) and flickers the light-emitting diodes 4. The switching signal b'' and the clock signal c'' are input to a modulation signal generation circuit 19. This circuit modulates received signals to generate a signal which is synchronous with, delayed from or reverse to the flickering of the light-emitting diodes 4 (a signal synchronous with the flickering is taken as an example in the following descriptions). That is, the modulation signal generation circuit 19 generates a sync signal d which is synchronous with the flickering of the light-emitting diodes 4, depending on the clock signal c''.

The sync signal d activates an infrared LED, a signal transmission means 8, to transmit a signal to the relay self-illuminant delineator 1'' or the terminal self-illuminant delineator 1''' without using transmission wires.

Referring to FIG. 2 (b) illustrating the block circuit diagram of the relay self-illuminant delineator 1'' or the terminal self-illuminant delineator 1''', the sync signal d generated by the infrared LED of the key station self-illuminant delineator 1' shown in FIG. 2 (a) is received by a reception means 9 composed of a light-receiving device such as a photosensor. The demodulation circuit 17 uses a high-pass filter or other means to eliminate noise from the sync signal d received by the reception means 9 and outputs a sync demodulation signal e. The light-emitting control circuit 15 receives the sync demodulation signal e and the switching signal b' which is output from the lighting discrimination circuit 18 when the voltage generated by the solar cell module 2 is below the reference voltage. As a result, the light-emitting control circuit 15 flickers the light-emitting diodes 4 of the delineator 1'' at a certain cycle synchronous with (delayed from or reverse to) the flickering of the light-emitting diodes 4 of the key station self-illuminant delineator 1'.

In the relay self-illuminant delineator 1'', the modulation signal generation circuit 19 receives the switching signal b'' output from the lighting discrimination circuit 18 and the sync demodulation signal e output from the demodulation circuit 17 in the same way as described above. The modulation signal generation circuit 19 periodically generates a sync signal f at a certain cycle synchronous with (delayed from or reverse to) the flickering of the light-emitting diodes 4 of the key station self-illuminant delineator 1' to activate the infrared LED (signal transmission means 8). The emitted light is transmitted to the adjacent relay self-illuminant delineator 1'' or the terminal self-illuminant delineator 1'''.

In the terminal self-illuminant delineator 1''', however, only the reception means 9, the demodulation circuit 17 and the light emitting control circuit 15 are used to flicker the light-emitting diodes 4 of the terminal delineator 1''' at a certain cycle synchronous with (delayed from or reverse to) the flickering of the light-emitting diodes 4 of the key station and relay self-illuminant delineators 1' and 1''. Thus, the demodulation circuit 17 and the infrared LED 8 are not necessary.

The voltage signal a of the solar cell module 2 and the lighting discrimination circuit 18 can be eliminated from the relay and terminal self-illuminant delineators 1'' and 1''' so that the light-emitting diodes 4 and the modulation signal generation circuit 19 can be activated by only the sync demodulation signal e from the demodulation circuit 17.

Furthermore, an FM signal can be used through antennas, instead of the infrared LED and the photosensor used in the block circuit diagrams described above.

Moreover, the transmission means for signal relay can also be eliminated by directly transmitting the flickering signal from the key station delineator to other delineators using an infrared LED with high directivity. In this case, the relay delineators do not need any transmission means for signal relay but the same signal reception means as that for the terminal delineator.

A combination of the key station delineator and only one delineator with the above-mentioned signal reception means and with no transmission means can be used depending on the length of a sign line-up. By combining a plurality of the self-illuminant delineators (key station, relay and terminal delineators) having the constructions described above, all the self-illuminating delineators can be flickered synchronously or alternately with one another. Thus, the entire line-up seytem can flicker at regular intervals so that drivers can accurately recognize zigzag courses and sharp curves.

Even if some self-illuminant delineators are shaded by a tree or a building located along a road earlier than other delineators in the twilight, the voltage of the solar cell module of the key station self-illuminant delineator remains higher than the activation voltage since the key station delineator is still exposed in the sunlight. Therefore, no sync signal is transmitted to the shaded delineators. This prevents the shaded delineators from flickering. In this way, the key station self-illuminant delineator controls the rest of the self-illuminant delineators so that the line-up of the delineators can be flickered synchronously or alternately as intended.

As described above, means for transmitting and receiving the signal to control the flickering cycle of the light-emitting diodes are provided in a plurality of the self-illuminant delineators of the present invention so that the self-illuminant delineators can flicker in coordination with one another to provide drivers with accurate traffic information.

Since a plurality of the self-illuminant delineators can be flickered simultaneously, the generated light can be recognized more easily.

Referring to FIGS. 11 and 12, another embodiment of the present invention is described.

FIG. 11 shows a self-illuminant delineator system comprising a plurality of self-illuminant delineators installed at equal intervals along a road guide rail. more particularly, FIG. 11 shows a plurality of self-illuminant delineators 1 which are combined with guide rail G provided along the curved road shoulder of speedway R and are lined up at equal intervals so that the line connecting the delineators forms the same curve as that of the curved road.

Referring to FIG. 11, numeral 1' designates a delineator which functions as a key station. This key station delineator 1', functions to automatically flicker its light-emitting diodes 104 and generates a synchronization control signal hereinafter referred to as "sync signal"), so that the light-emitting diodes 104 of relay delineators and terminal delineators described below can flicker synchronously with the light-emiitting diodes 104 of the key station delineator 1'. Numeral 1'' designates a relay delineator. This relay delineator 1'' is installed between the key station delineator 1' and some terminal delineators (described below ) which are installed beyond the transmission distance of the sync signal transmitted from the key station delineator 1'. The relay delineator 1'' receives the sync signal transmitted from the key station delineator 1' to automatically flicker its light-emitting diodes 104 in synchronization with the flickering period of the light-emitting diodes 104 of the key station delineator 1' and relays the sync signal to the terminal delineators which are installed beyond the transmission distance of the sync signal transmitted from the key station delineator 1'. Numeral 1''', designates a terminal delineator. The terminal delineators 1''', are the delineators installed between the key station delineator 1' and the relay delineator 1'', and the delineators installed more remote from the key station delineator 1' than the relay delineators 1''. The terminal delineators 1''' receive the sync signal transmitted from the key station delineator 1' and the sync signal relayed by the relay delineators 1'' to automatically flicker their light-emitting diodes 104 in synchronization with the flickering period of the light-emitting, diodes 104 of the key station and relay delineators 1' and 1''.

Figure 12A:
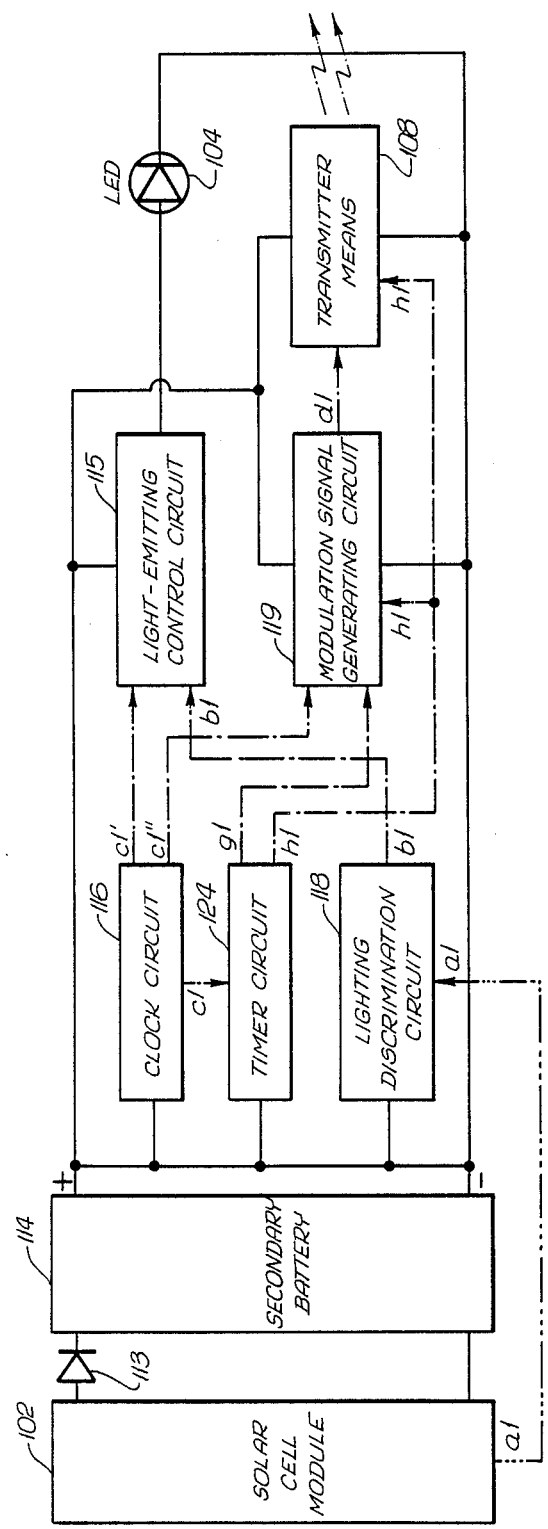
FIG. 12(a) is a block circuit diagram of a self-illuminant delineator which functions as a key station of the self-illuminant delineator system of the present invention shown in FIG. 11.

FIG. 12(a) is a block diagram of the lighting control circuit of the self-illuminant delineator 1' which functions as the key station. Referring to FIG. 12(a), numeral 102 designates a solar cell module and numeral 114 is a secondary battery such as a Ni—Cd battery. The solar cell module 102 and the secondary battery 114 are connected via a reverse blocking diode 113. The secondary battery 114 stores electromotive force generated by the solar cell module 102 and delivers the electromotive force when no electricity is generated in the nighttime. The secondary battery 114 also functions to apply forward bias voltage to the light-emitting diodes and to supply electric power to the lighting control circuit described below.

The lighting control circuit is composed of a lighting discrimination circuit 118, a clock circuit 116, a light-emitting control circuit 115, a timer circuit 124, a modulation signal generation circuit 119 and a transmitter means 18.

The lighting discrimination circuit 118 detects electromotive voltage signals a1 of the solar cell module 102, compares this electromotive voltage signal with a reference voltage and outputs switching signal b1 to the light-emitting control circuit 115 when the level difference between the two is below a predetermined level.

The clock circuit 116 is composed of a quartz oscillator, a multivibrator, etc. and generates clock pulse signals c1, c1' and c1'' having predetermined frequencies. These clock pulse signals c1, c1' and c1'' are output to the timer circuit 124, the light-emitting control circuit 115 and the modulation signal generation circuit 119.

Figure 13:
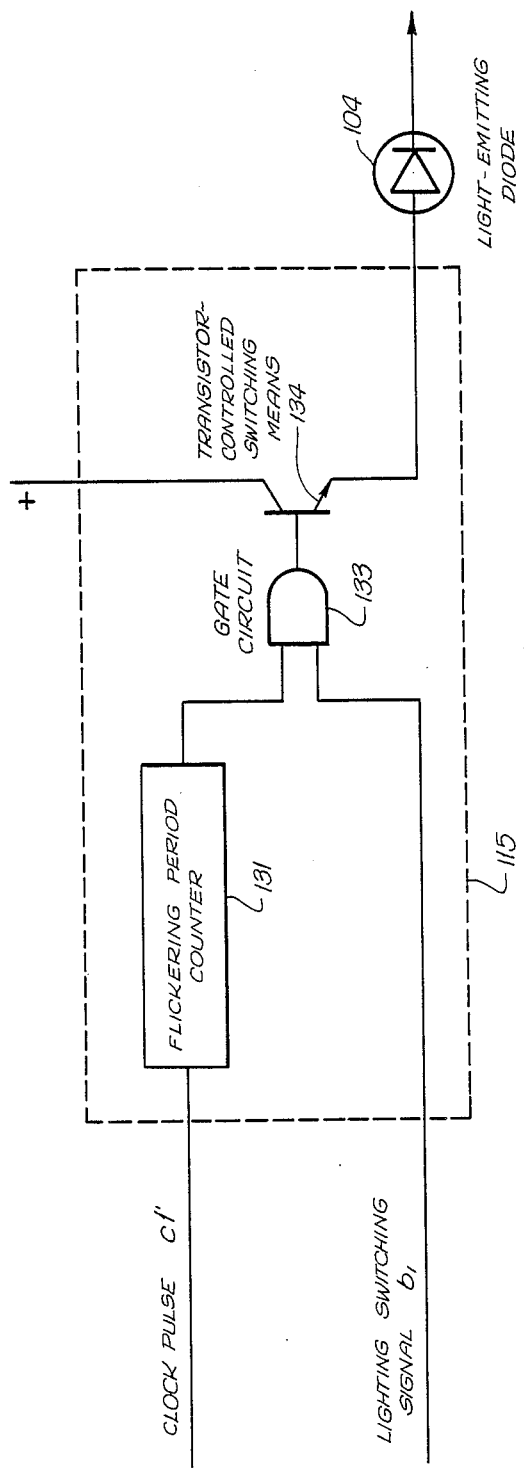
FIG. 13 is a block circuit diagram of a light-emitting control circuit.

Referring to FIG. 13, the light-emitting control circuit 115 may be composed of a flickering period counter 131, a gate circuit 133 and a transistor-controlled switching means 134, and counts the clock pulse signal c1' to determine the flickering period of the light-emitting diode 104. The counter signal is logically operated with the input switching signal b1 and controlled by the switching means 134 to flicker the light-emitting diodes 104.

Referring to FIG. 14(a), the timer circuit 124 is composed of a reference signal generation counter, such as a one-hour counter 141, and a start time control signal generation counter, such as a 59-minute, 40-second counter 142. The timer circuit 124 counts clock pulse signal c1 and outputs trigger-like reference signal g1 which functions as a reference signal for synchronization correction to the modulation signal generation circuit 119, every specified time, for example every 60 minutes. When the timer circuit 124 counts the clock pulse signal c1 and generates reference signal g1 which corresponds to signal d1 every specified time, for example every 60 minutes, a start time control signal h1 is output to the transmitter means 108 and the modulation signal generation circuit 119 for 20 seconds from 59 minutes 40 seconds until the timer circuit 124 is reset by the reference signal g1. In this case, the start time control signal h1 goes high only for 20 seconds and goes low when the reference signal g1 is generated so that the start time of the transmitter means 108 and the modulation signal generation circuit 119 can be controlled only for the minimum time required for synchronization with the flickering period of each delineator. This control is very useful to minimize power consumed by the control circuit and to properly operate the entire system where solar cell modules are used.

FIG. 14(b) shows a modified example of the timer circuit 124. In this example, a 59-minute, 40-second counter 142 and a 60-minute, 20-second counter 143 are connected in parallel as a start time control signal generation counter so that the start time control signal h1 goes high for 40 seconds from the time of 59 minutes and 40 seconds (before generation of the reference signal g1) to the time of 60 minutes and 20 seconds (after generation of the references signal g1).

Figure 15:
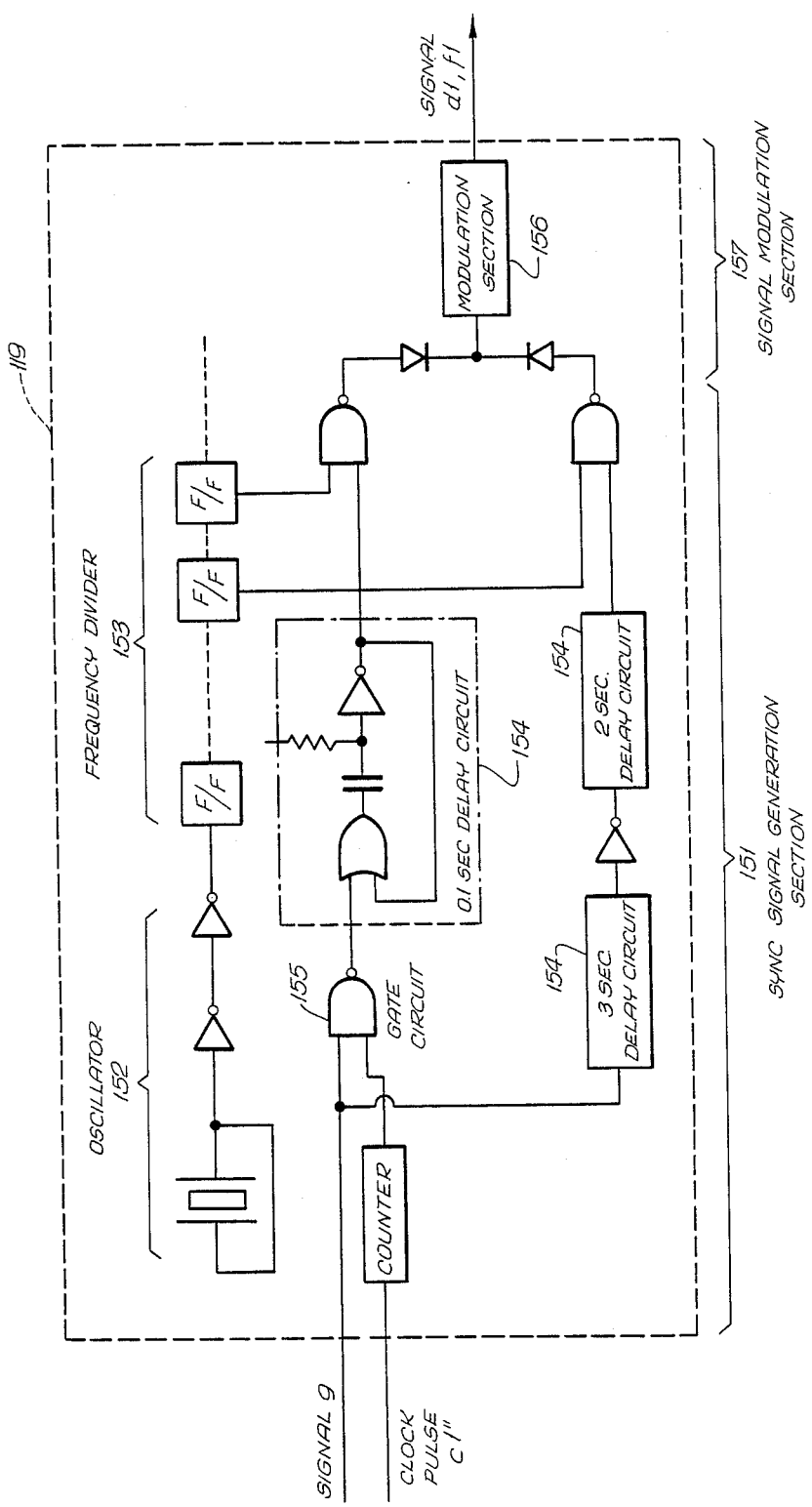
FIG. 15 is a block circuit diagram of a modulation signal generation circuit.

As shown in FIG. 15, the modulation signal generation circuit 119 is composed of a sync signal generation section 151 including an oscillation circuit 152, a frequency divider 153, delay circuits 154, gate circuits 155, and a signal modulation section 156. Based on the clock pulse signal c1'', the modulation signal generation circuit 119 generates sync signal d1 composed of a specifically arranged pulse signal and modulates the sync signal d1 using the supplied reference signal g1. Modulated signal d1 obtained by modulation is output to the transmitter means 108. The transmitter means 108 is composed of a band-pass filter, an RF amplifier, an antenna, etc. and transmits the sync signal d1 on a radio wave having a specified frequency to the relay and terminal delineators.

For the key station self-illuminant delineator 1', when the amount of light around the delineator decreases early in the evening or due to cloudy weather, the electromotive force of the solar cell module 102 decreases and the switching signal b1 is output from the lighting discrimination circuit 118 to the light-emitting control circuit 115. After receiving the switching signal b1, the main lighting circuit of the light-emitting control circuit 115 turns on and off according to a predetermined flickering period to flicker the light-emitting diodes 104.

Regardless of the amount of light around the delineator, the clock circuit 116 and the timer circuit 124 operate. In particular, the timer circuit 124 outputs the trigger-like reference signal g1 to transmit the sync signal d1, and also outputs the start time control signal h1 to control the operation time of the transmitter means 108, as described above. When for example 59 minutes and 40 seconds passes after generation of the preceding reference signal g1, the start time control signal h1 goes high and electric power is supplied to the modulation signal generation circuit 119 and the transmitter means 108 which includes the RF amplifier and greatly consumes electric power of the secondary battery. The sync signal d1 is then generated by the modulation signal generation circuit 119. After 20 more seconds, the reference signal signal g1 is input to the modulation signal generation circuit 119, and at this moment the sync signal d1 is transmitted from the transmitter means 108.

Figure 12B:
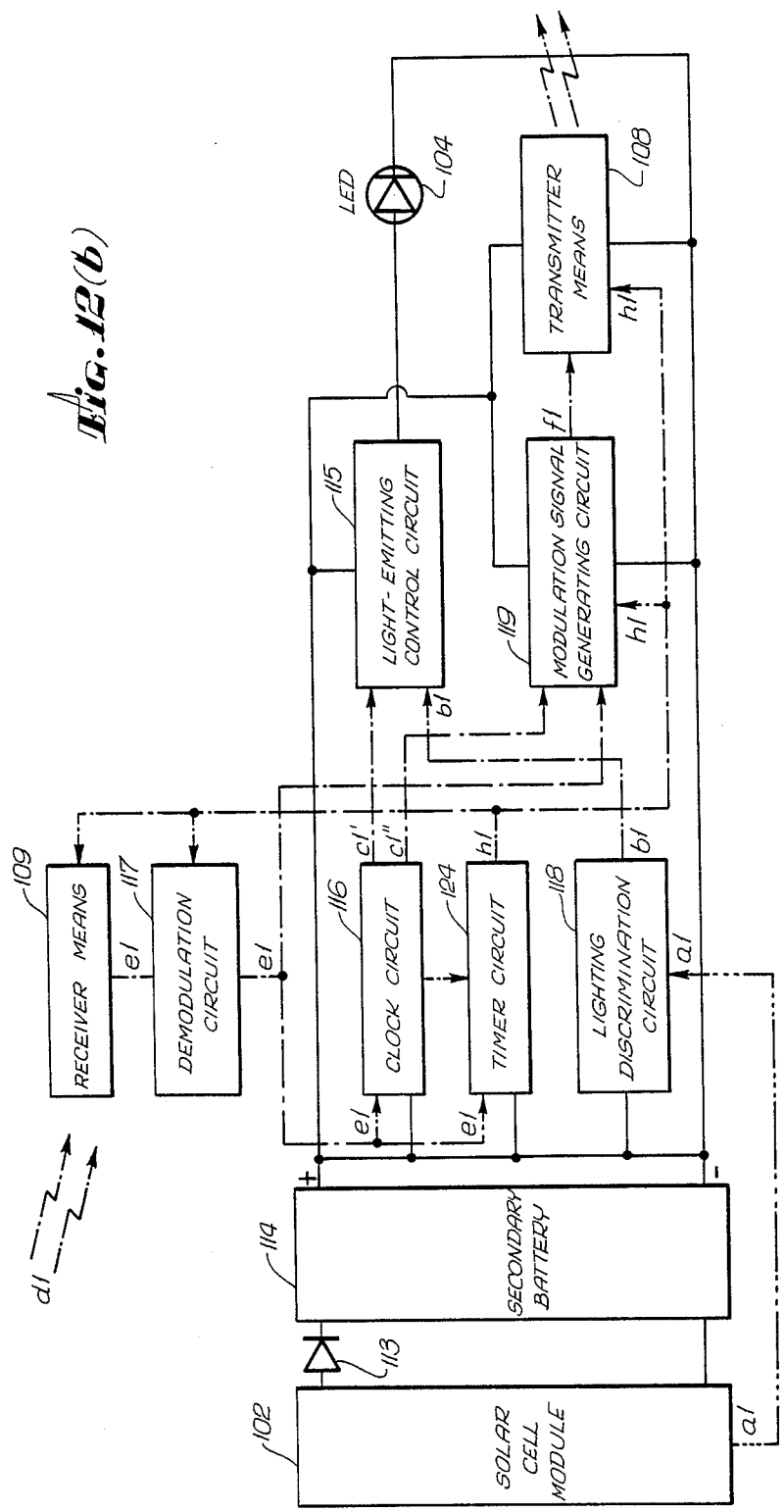
FIG. 12(b) is a block circuit diagram of a self-illuminant delineator which functions as a relay delineator of the self-illuminant delineator system shown in FIG. 11.

FIG. 12(b) is a block circuit diagram of the relay self-illuminant delineator 1''. Referring to FIG. 12(b), numeral 109 designates a receiver means and numeral 117 designates a demodulation circuit. Since the other circuits of the relay delineator 1'',are the same as those of the key station delineator 1', they are designated by the same numbers but are not explained here.

The receiver means 109, composed of an antenna, a band-pass filter and a detection circuit, receives a radio wave having a predetermined frequency from the key station delineator and extracts the sync signal d1. The demodulation circuit 117 converts the sync signal d1 received by the receiver means 109 into an electrical signal and outputs a trigger-like flickering synchronization demodulation signal e1 which corresponds to the reference signal g1 of the key station delineator 1'. The flickering synchronization demodulation signal e1 is output to the clock circuit 116, the timer circuit 124 and the modulation signal generation circuit 119 to reset the clock circuit 116 and the timer circuit 124 and to function as a timing signal for transmitting the sync signal f1 of the modulation signal generation circuit 119.

The timer circuit 124 must output at least the start time control signal h1. The reference signal g1 is substituted by the flickering synchronization demodulation signal e1. The start time control signal h1 has a slight error since the timer circuit 124 which was reset by the preceding flickering synchronization demodulation signal e1 counts the clock pulse signal c1. However, the start time control signal h1 goes high after approximately 59 minutes and 40 seconds and sets the receiver means 109, the demodulation circuit 117, the transmitter means 108 and the modulation signal generation circuit 119 on standby, and waits for the sync signal d1 which is received after 20 seconds.

For the relay self-illuminant delineator 1'' having the structure described above, the light-emitting diodes 104 flicker when the amount of light around the delineator decreases early in the evening or due to cloudy weather in the same way as in the case of the key station delineator 1'.

Regardless of the amount of light around the delineator, the clock circuit 116 and the timer circuit 124 operate. In particular, the timer circuit 124 turns on the receiver means 109, the transmitter means 108, the demodulation circuit 117 and the modulation signal generation circuit 119 for approximately 20 seconds when 59 minutes and 40 seconds passes after the preceding sync signal d1 was received. This is done to efficiently receive the sync signal d1 from the key station delineator 1' and the power consumption of the secondary battery 114 can by minimized. When the sync signal d1 is received during the start operation, the flickering synchronization modulation signal e1 is output from the demodulation circuit 117 to reset the clock circuit 16 and the timer circuit 124. As a result, the flickering period determined by the light-emitting control circuit 115 can be corrected in terms of synchronization by initialization of the clock pulse signal cl'. In addition, the timer circuit 124 can accurately measure the output time of the next start time control signal h1.

More particularly, the relay delineators 1'' and the terminal delineators 1''' which receive the sync signal d1 transmitted from the key station delineator 1' simultaneously start receiving operation. At this time, reception of the sync signal d1 and synchronization correction of the flickering period are performed simultaneously. Therefore, the flickering of the light-emitting diodes 104 of the delineators 1', 1'' and 1''' can be synchronized or regulated for sequential flickering.

The frequency of the sync signal d1 transmitted from the key station delineator 1' must differ from the frequency of the sync signal f1 transmitted from the relay delineator 1'' to prevent malfunction of the terminal delineators 1''' which are installed within the transmission distances of the signals d1 and f1.

The block circuit diagram of the terminal delineator 1''' is not shown since the block circuit diagram is the same as that of the relay delineator 1'' except that the transmitter means 108 and the modulation signal generation circuit 119 are removed.

Figure 16:
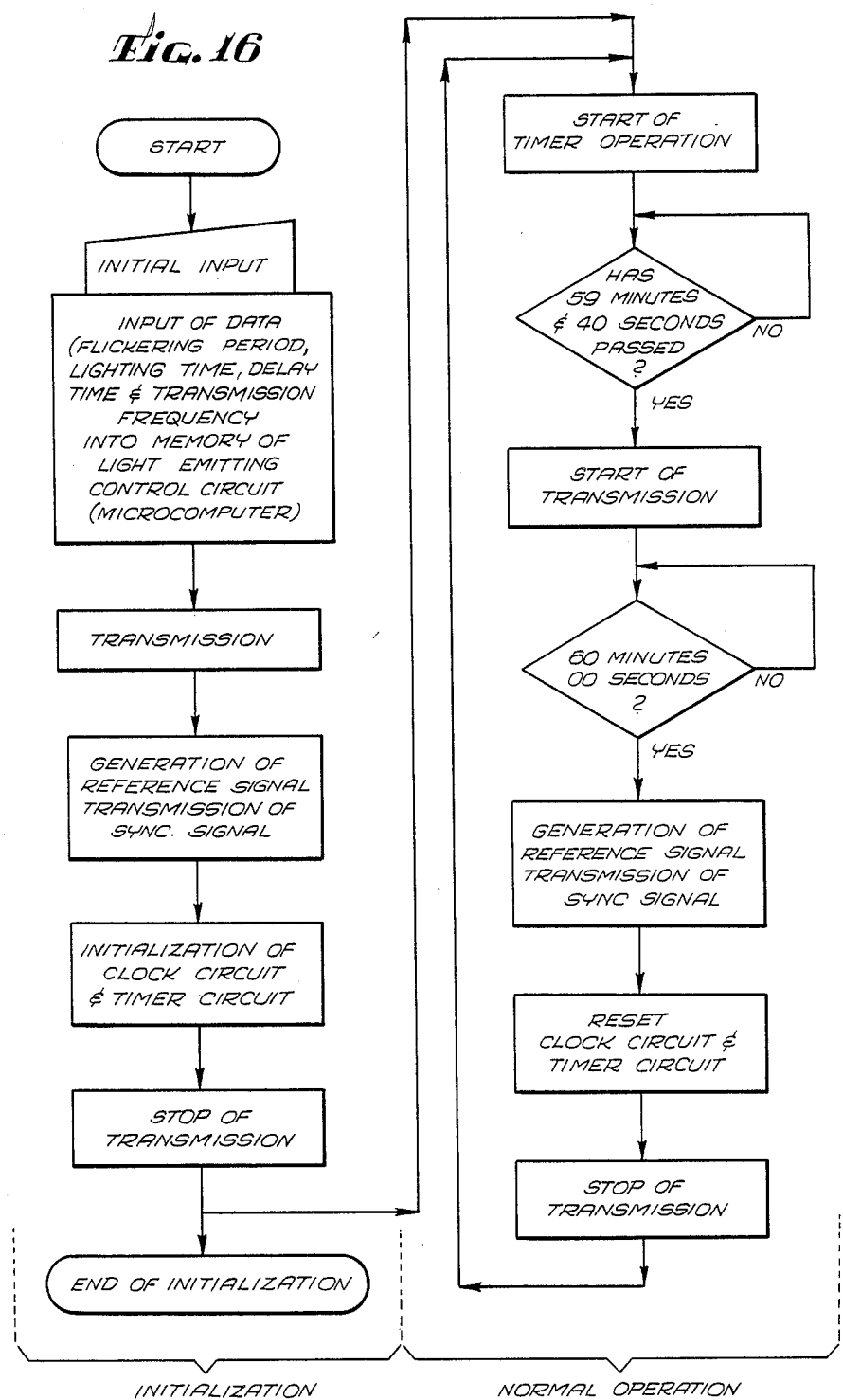
FIG. 16 is a flow chart of the operation of a key station delineator.
Figure 17:
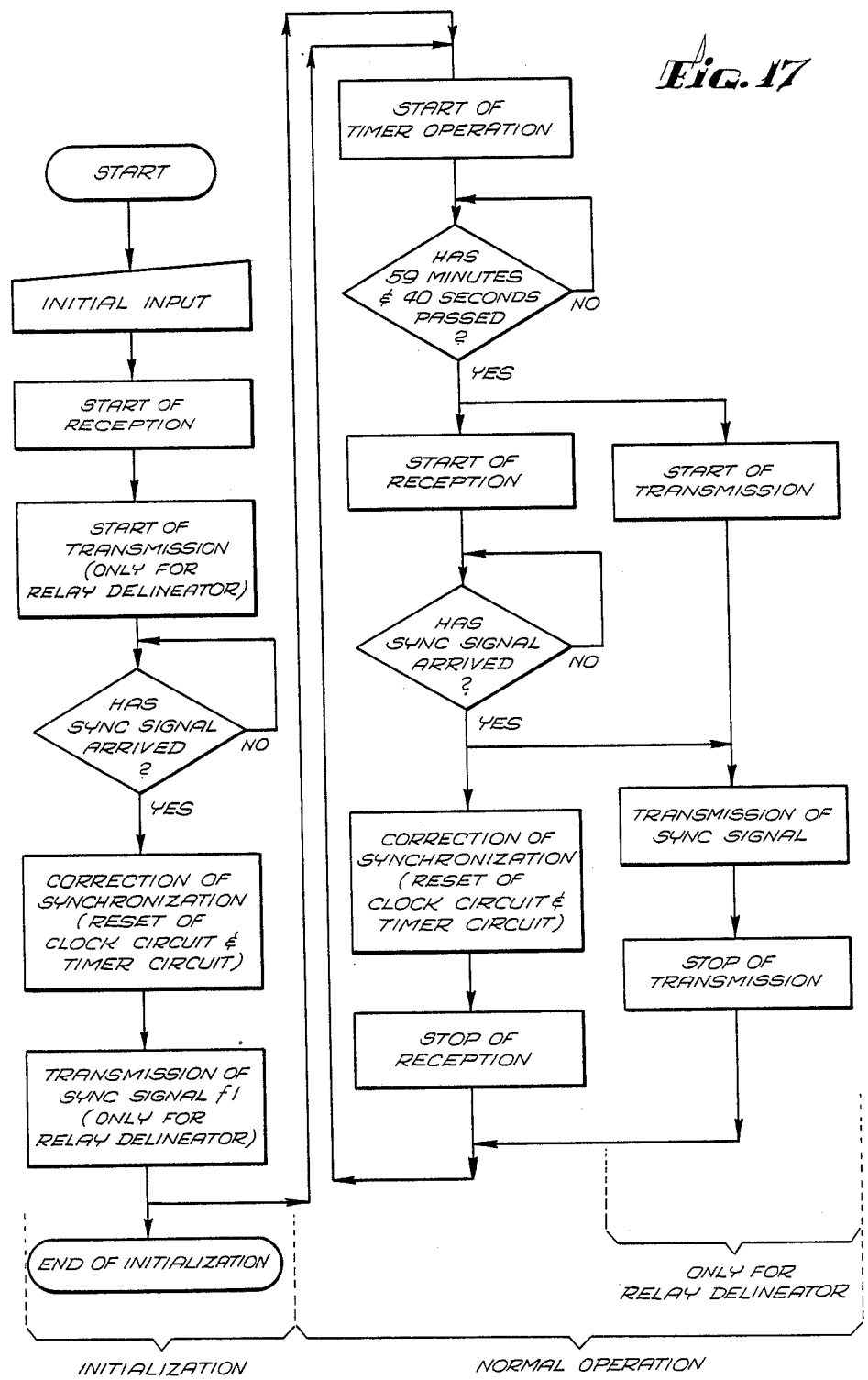
FIG. 17 is a flow chart of the operation of a relay delineator and a terminal delineator.

The operations of the above-mentioned delineators 1', 1'' and 1''' can be controlled by software program input in a microprocessor of the system. FIG. 16 is a flowchart of the operation of the key station delineator 1' and FIG. 17 is the flowchart of the operations of the relay delineator 1'' and the terminal delineator 1'''. Reference FIG. 18 is the signal time chart of the delineators 1', 1'' and 1'''.

Thus, according to this embodiment of the present invention, the receiver means and/or transmitter means and the demodulation circuit and/or demodulation signal generation circuit are started only for a short time just before and after the time when the sync signal is transmitted and/or received by the start time control signal supplied from the timer circuit. Therefore, the power consumption of the secondary battery, that is, the consumption of the electromotive force generated by the solar cell module of a limited area at the top surface of the delineator can be minimized. This is greatly useful to realize this kind of system.

The extensively modified embodiments of the self-illuminant delineator construction of the present invention are described below.

(i) The transparent cover 3 for the solar cell module 2

(a) The transparent cover 3 has a shape of an almost oval hemisphere (FIG. 1) or an almost hemisphere. The solar cell module 2 is almost horizontally installed on the top surface of the body casing 5. With this construction, the self-illuminant delineator 1 can be installed anywhere regardless of the incident angle of the sunlight and the altitude of the sun (omnidirectional to the incident angle of the sunlight) and high output can be obtained at all times. The following three tests were conducted to confirm these benefits of the delineator.

Figure 4:
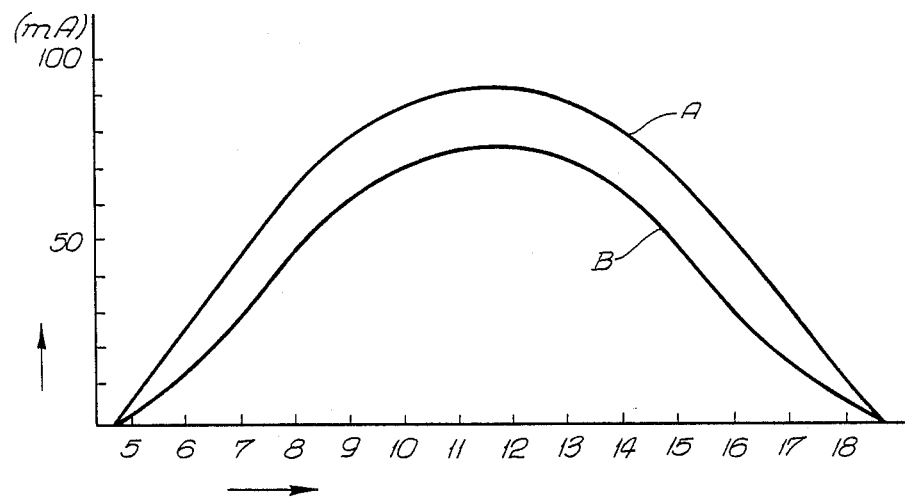
Figure 5:
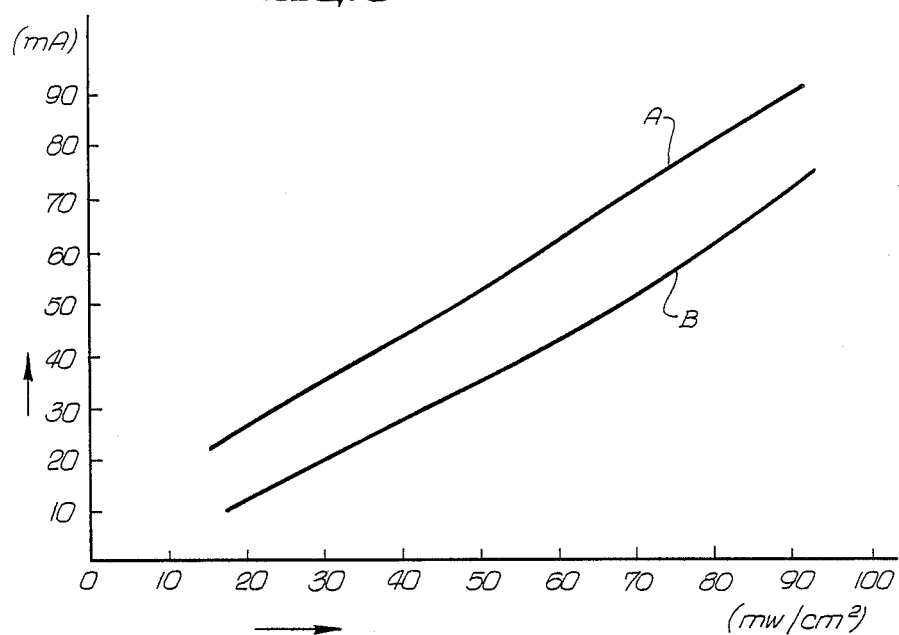
Figure 6:
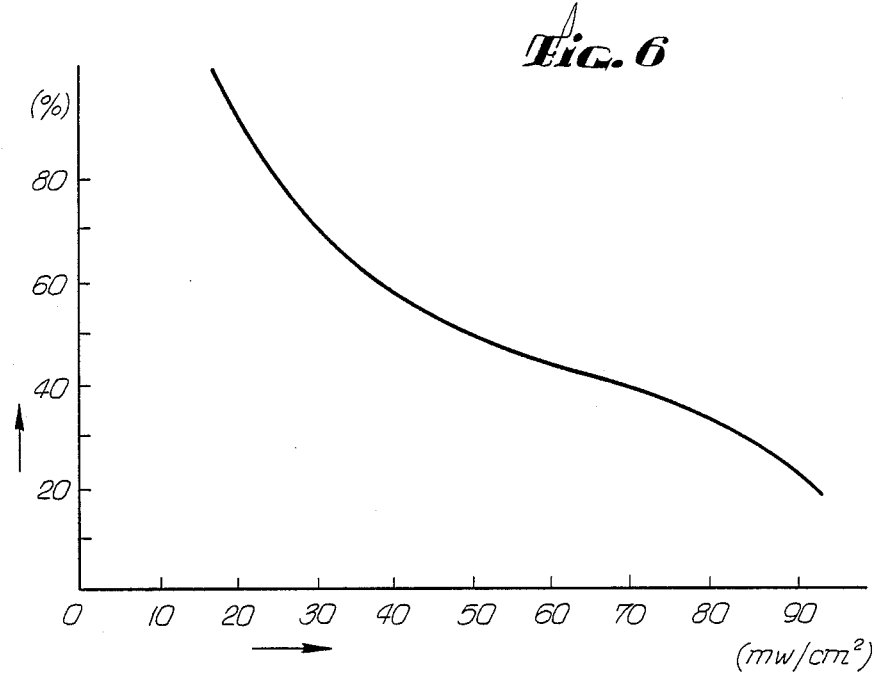

Solar cell module A which was composed of the solar cell module 2 horizontally installed on the top surface of the body casing 5 and covered with the oval hemispheric transparent cover 3 (made of silicon resin or EVA) with a round light receiving surface (25 mm in radius) was compared with solar cell module B which was composed of the solar cell module 2 not covered. The top surface area of the delineator 1 was approximately 50 cm$^2$. In the central area of the top surface, the solar cell module 2 having a light receiving area of approximately 30 cm$^2$ was provided. FIGS. 4 to 6 show data obtained on a fine day around Mar. 21, 1985 at Konan area of Shiga, Japan.

FIG. 4 shows the change of the output current of the solar cell module A covered with the transparent cover 3 compared with that of the solar cell module B not covered. The horizontal axis indicates the time elapsed from sunrise to sunset. The vertical axis indicates the output current.

According to the test result shown in FIG. 4, it is understood that the solar cell module A covered with the transparent cover 3 can deliver larger output current due to high condensing capacity regardless of the incident angle of the sunlight and the altitude of the sun. FIG. 5 shows the output currents of the solar cell modules A and B depending on the illuminance of the sunlight. The horizontal axis indicates the illuminance of the sunlight and the vertical axis indicates the output current.

According to the test result shown in FIG. 5, it is understood that the output current delivered by the solar cell module A is 15 to 25 mA larger than that delivered by the solar bell module B. FIG. 6 shows the increasing ratio in percentage of the output current of the solar cell module A covered with the transparent cover 3 over that of the solar cell module B not covered depending on the illuminance of the sunlight. The horizontal axis indicates the illuminance of the sunlight and the vertical axis indicates the increasing ratio in percentage of the output current of the solar cell module A over that of the solar cell module B.

According to the test result shown in FIG. 6, it is found that the solar cell module A is extremely superior in output characteristics especially when the illuminance of the sunlight is low due to low altitude of the sun, cloudy weather or weak sunlight caused by obstacles. As can be understood referring to FIGS. 4, 5 and 6, the solar cell module 2 covered with the oval hemispheric transparent cover 3 disposed on the limited top surface of the delineator 1 can deliver larger output current than the conventional construction at all times regardless of the incident angle of the sunlight and the altitude of the sun. The solar cell module 2 covered with the transparent cover 3 can deliver large output current even when the altitude of the sun is low or when the illuminance of the sunlight is low due to cloudy weather.

(b) As shown in FIG. 7, a transparent extension section 20 is extended from the front surface of the transparent cover 3 and a reflection layer 21 is formed on the rear surface of the transparent extension section 20. With this construction, the solar cell module 2 can operate even when the surface of the transparent cover 3 is covered with snow or dust. More particularly, sunlight $\lambda$ from the external surface of the transparent extension section 20 passes through the inside of the transparent extension section 20, is totally reflected by the reflector layer 21 formed on the rear side of the transparent extension section 20, passes straight through the inside of the transparent extension section 20 and is reflected again by the interfacial surface of the transparent extension section 20 as shown in FIG. 8. That is, the incident sunlight from the external surface of the transparent extension section 20 is diffusedly reflected in the extension section 20 and then transmitted to the transparent cover 3.

With this construction, even when the light receiving surface of the transparent cover 3 is heavily covered with snow (or dust) S and the sunlight cannot reach the light receiving surface, the sunlight from the external surface of the transparent extension section 20 is transmitted from the transparent extension section 20 to the inside of the transparent cover 3. As a result, the solar cell module 2 can deliver output voltage.

Figure 9:
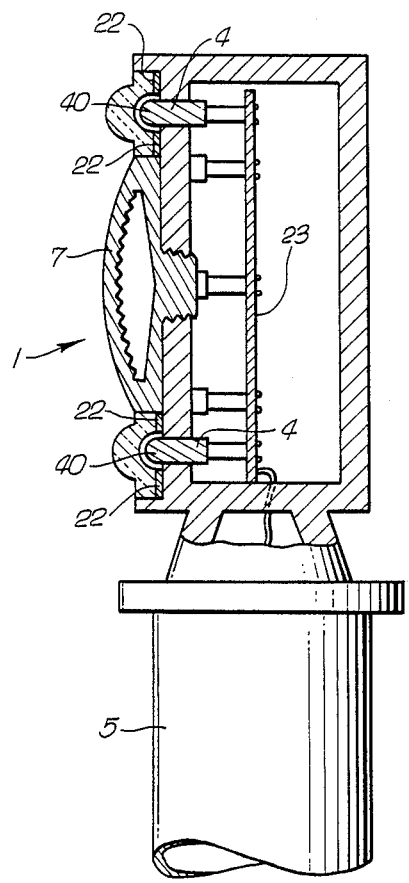

(ii) As shown in FIG. 9, a reflection layer 22 is formed above, below and adjacent to the light-emitting section 40 of the light-emitting diodes 4, except the region for the light-emitting section 40, on the rear side of the transparent front cover 6 which covers the light-emitting diodes 4. With this construction, the entire surface or the main part of the delineator appears to emit light since the light of the light-emitting diodes, which is high in directivity, is fully utilized, with less current consumption. Therefore, a traffic sign line-up composed of the delineators having this construction can be recognized more easily and can help drivers prevent traffic accidents.

Figure 10:
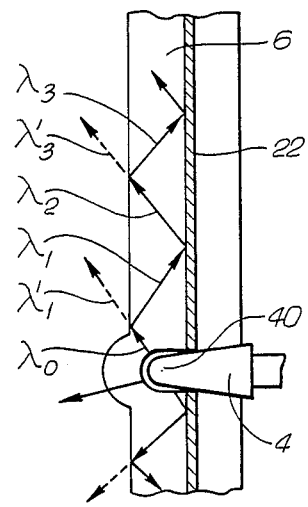

In the case of the above construction shown in FIG. 10, the light of the light-emitting diodes 4 is emitted from each tip (light-emitting point) of the light-emitting section 40 projected into the transparent cover 3 when the light-emitting diodes 4 are activated. Light $\lambda_o$ emitted obliquely and forwardly from the tip passes straight through the inside of the transparent front cover 6. A part of the light $\lambda_o$ is transmitted outward (transmission light $\lambda'_1$) at the interfacial surface of the transparent front cover 6 and the rest of the light passes straight through the inside of the transparent front cover 6. The primary reflection light $\lambda_1$ is totally reflected by the reflection layer 22 provided on the rear side of the transparent front cover 6. The totally reflected secondary reflection light $\lambda_1$ passes through the inside of the transparent front cover 6 again. A part of the secondary reflection light $\lambda_2$ is transmitted outward (transmission light $\lambda'_3$) at the interfacial surface of the transparent front cover 6 and the rest of the secondary reflection light $\lambda_2$ is reflected (tertiary reflection light $\lambda_3$). That is, the light emitted in all directions from the tip of the light-emitting section 40 is diffusedly reflected in the transparent front cover 6 which covers at least the sections above, below and adjacent to the light-emitting section 40. As a result, the entire surface of the transparent front cover 6 appears to emit light. Thus, drivers can recognize the delineator system more easily.

The light reflection layer 22 in FIG. 9 may have a retroreflection surface having, for example, a prism cut or a diamond cut (not shown). This retroreflection surface is provided on the rear surface of the cover section other than the light-emitting section to effectively retroreflect the light emitted from the headlights of automobiles.

Accordingly, the extensively modified embodiments described above are preferably applicable to the delineator system of the present invention. Having described our invention as related to the embodiments shown in the accompanying drawings, it is our intention that the invention be not limited by any of the details of description, unless otherwise specified, but rather be construed broadly within its spirit and scope as set out in the accompanying claims.

We claim:

1. A self-illuminant delineator comprising a plurality of light-emitting diodes disposed on a sign surface of said delineator; power supply means for powering the light-emitting diodes including a solar cell module disposed on the top surface of said delineator and covered with a transparent cover and a rechargeable battery for storing power; control means for controlling the flickering of the light-emitting diodes; and communication means for periodically transmitting or receiving a reference signal to synchronize the control means for the flickering of said light emitting diodes; wherein the power supply means also supplies power to the communication means, and the control means further includes timing means for controlling duration during which power is supplied to the communication means from the power supply; wherein said solar cell module is substantially horizontally disposed on the top surface of said delineator and said transparent cover for covering said solar cell module is substantially oval hemispheric or substantially hemispheric and is mounted and fixed on the top surface of said delineator so as to provide a convex external surface; and further wherein the solar cell module supplies power to said rechargeable battery and functions as an optical sensor for generating a signal when the incident light drops below a predetermined level.

2. A self-illuminant delineator according to claim 1, wherein the transparent cover further covers said sign surface of said delineator and wherein a light reflection layer is formed between said transparent cover and said sign surface, except the light-emitting regions of said light-emitting diodes.

3. A self-illuminant delineator according to claim 2, wherein said light-emitting diodes are disposed spacedly and circularly on said sign surface and a retroreflection reflector is disposed coaxially to and inside said diodes.

4. A self-illuminant delineator according to claim 1, wherein the front section of said transparent cover for covering said solar cell module is extended to said sign surface of said delineator casing as a transparent extension section and a light reflection layer is formed on the rear side of said transparent extension section.

5. A self-illuminant delineator system including a plurality of self-illuminant delineators comprising a plurality of light-emitting diodes disposed on a sign surface of said self-illuminant delineators and covered by a transparent cover; power supply means for powering the light-emitting diodes including a solar cell module provided on the top surface of said delineator and covered with a transparent cover, and a rechargeable battery for storing power; and communication means comprising at least transmission means or reception means for transmitting or receiving a reference signal which controls the flickering of said light-emitting diodes; wherein said solar cell module is substantially horizontally disposed on the top surface of said delineator and said transparent cover for covering said solar cell module is substantially oval hemispheric or substantially hemispheric and is mounted and fixed on the top surface of said delineator so as to provide a convex external surface; wherein the solar cell module supplies power to said rechargeable battery and functions as an optical sensor for generating a signal when the incident light drops below a predetermined level; wherein a self-illuminant delineator with only said transmission means is used as a key station delineator; a plurality of self-illuminant delineators with both said transmission and reception means are used as relay delineators, the transmission means of each said relay delineator transmitting a reference signal in accordance with a reference signal received by its reception means; and a self-illuminant delineator with said reception means and with no transmission means is used as a terminal delineator, and these self-illuminant delineators are spacedly installed to form a line-up of an eye-guiding, traffic or other sign along a shoulder of a road or passageway; and further wherein the power supply means also supplies power to the communication means and is provided with timing means for controlling duration during which power is supplied to the communication means from the power supply.

6. A self-illuminant delineator system according to claim 5, wherein said transmission means of said key station self-illuminant delineator comprises a lighting discrimination circuit which generates a switching signal when the output voltage of said solar cell module drops below a certain level, a clock circuit which receives said switching signal and generates a clock signal, a lighting control circuit which receives said clock signal and generates a signal to flicker said light-emitting diodes, a modulation signal generation circuit which generates a modulation signal synchronous with, delayed from or reverse to the flickering of said light-emitting diodes, and an infrared LED which receives said modulation signal from said modulation signal generation circuit and emits infrared light to transmit said modulation signal.

7. A self-illuminant delineator system according to claim 5, wherein said reception means of said relay self-illuminant delineator comprises of a light-receiving device such as a photosensor which receives infrared modulation signal transmitted from said key station self-illuminant delineator and a demodulation circuit which eliminates noise from said modulation signal and generates a demodulation signal which is input to said lighting control circuit and said modulation signal generation circuit, and said transmission means of said relay self-illuminant delineator comprises a lighting discrimination circuit which generates a switching signal when the output voltage of said solar cell module drops below a certain level, a clock circuit which receives said switching signal and generates a clock signal, a lighting control circuit which receives said clock signal and said demodulation signal, and generates a signal to flicker said light-emitting diodes, a modulation signal generation circuit which receives said demodulation signal from said demodulation circuit and generates a modulation signal synchronous with, delayed from or reverse to the flickering of said light-emitting diodes, and an infrared LED which receives said modulation signal and emits infrared light to transmit said modulation signal.

8. A self-illuminant delineator system according to claim 5, wherein said reception means of said terminal self-illuminant delineator comprises a light-receiving device such as a photosensor which receives infrared modulation signal transmitted from said relay self-illuminant delineator and a demodulation circuit which eliminates noise from said modulation signal and generates a demodulation signal which is input to said lighting control circuit.

9. A self-illuminating delineator comprising:
a housing;
at least one indicator light mounted to the surface of the housing such that the indicator light is visible from outside the housing;
power supply means for powering the indicator light, said power supply means including a rechargeable battery for storing power and a solar cell module substantially horizontally disposed on the top surface of said delineator and a cover means for directing light onto the solar cell module, said cover means for covering said solar cell module being substantially oval hemispheric or substantially hemispheric and being mounted and fixed on the top surface of said delineator so as to provide a convex external surface; said solar cell module supplying power to said rechargeable battery and generating a signal when the incident light drops below a predetermined level;
control means for periodically activating and deactivating the indicator lights;

communication means for periodically transmitting or receiving a reference signal to be used for synchronizing the control means;

a reflective layer covering the surface of the housing adjacent to the indicator light, the reflectice layer having a retroreflective surface facing away from the housing; and a transparent layer covering the reflective surface, whereby illumination from the indicator light is diffusely transmitted within the transparent layer; wherein the power supply means also supplies power to the communication means, and the control means further includes timing means for controlling duration which power is supplied to the communication means from the power supply.

10. A self-illuminating delineator comprising:

a housing;

at least one indicator light mounted to the surface of the housing such that the indicator light is visible from outside the housing;

power supply means for powering the indicator light said power supply means including a solar cell and a cover means for directing light onto the solar cell;

control means for periodically activating and deactivating the indicator light;

communication means for periodically transmitting or receiving a reference signal to be used for synchronizing the control means;

a reflective layer covering the surface of the housing adjacent to the indicator light, the reflective layer having a reflective surface facing away from the housing; and a transparent layer covering the reflective surface, whereby illumination from the indicator light is diffusely transmitted within the transparent layer wherein the transparent layer is optically coupled to the cover means such that when the reflective surface is exposed to light, the light is transmitted to the cover means to be focused onto the solar cell.

11. A system of self-illuminating delineators comprising:

a plurality of delineators including a key station delineator, at least one relay delineator and at least one terminal delineator, each delineator comprising:

a housing;

at least one indicator light mounted to the surface of the housing such that the indicator light is visible from outside the housing;

power supply means for powering the indicator light said power supply means including a rechargeable battery for storing power and a solar cell module substantially horizontally disposed on the top surface of said delineator and a transparent cover for covering said solar cell module, said transparent cover being substantially oval hemispheric or substantially hemispheric and being mounted and fixed on the top surface of said delineator so as to provide a convex external surface, said solar cell module supplying power to said rechargeable battery and generating a signal when the incident light drops below a predetermined level; and control means for activating and deactivating the indicator light, wherein the key station delineator further includes a transmission means for transmitting a reference signal to the relay delineator to be used for synchronizing the control means of the relay delineator, the relay delineator further includes a reception means for receiving the reference signal transmitted from the key station delineator and a retransmission means for transmitting a reference signal, in accordance with the reference signal received from the key station delineator to the terminal delineator to be used for synchronizing the control means of the terminal delineator, the terminal delineator further includes a reception means for receiving the reference signal transmitted from the relay delineator, further wherein:

the transmission means of the key station delineator and the retransmission means of the relay delineator each includes means for periodically transmitting the reference signal at a predetermined time interval;

the control means of the relay delineator and the terminal delineator further includes flickering means for activating and deactivating the indicator light at a predetermined frequency, and means for periodically synchronizing the flickering means each time a reference signal is received;

the power supply means is also supplies power to the reception means or the transmission means, and wherein the control means further includes timing means for controlling duration in which power is supplied to the transmission means or the reception means from the power supply;

the timing means includes means for starting and ending the supply power to the transmission means, or the reception means, at a predetermined time interval before and after the transmission means transmitted, or the reception means received, a reference signal, respectively.

12. A self-illuminant delineator system comprising a plurality of self-illuminant delineators comprising a plurality of light-emitting diodes disposed on the front surface of said delineator and covered by a transparent cover, a solar cell module being provided on the top surface of said delineator and covered with a transparent cover, a secondary battery used to store electromotive force generated by said solar cell module, a transmitter means and/or receiver means for a signal which controls the flickering operation of said light-emitting diodes, a light-emitting control circuit which controls the flickering operation of said light-emitting diodes, a timer circuit which controls the start time of said transmitter means and/or receiver means, a clock circuit which supplies a clock pulse signal to said light-emitting control circuit and said timer circuit, and a lighting discrimination circuit, wherein said solar cell module is substantially horizontally disposed on the top surface of said delineator and said transparent cover for covering said solar cell module is substantially oval hemispheric or substantially hemispheric and is mounted and fixed on the top surface of said delineator so as to provide a convex external surface, said solar cell module supplying power to said secondary battery and generating a signal when the incident light drops below a predetermined level; and further wherein said transmitter means is started by said secondary battery only during a predetermined time from the moment immediately before the transmission start of the light-emitting diodes flickering synchronization control signal generated from said timer circuit, said self-illuminant delineators which use said signal to reset said clock circuit and said timer circuit are used as terminal delineators and these delineators are spacedly installed to form a line-up of an eye-guiding, traffic or other sign along a shoulder of a road or passage way.

* * * * *